US012640839B2

(12) United States Patent　　　　(10) Patent No.:　US 12,640,839 B2
Ignatchenko　　　　　　　　　　　　(45) Date of Patent:　　May 26, 2026

(54) SYSTEMS AND METHODS FOR IMPROVING ASSET DOWNLOAD TIME USING FORWARD ERROR CORRECTION

(71) Applicant: Six Impossible Things Before Breakfast Limited, Dublin (IE)

(72) Inventor: Sherry Ignatchenko, Weidling (AT)

(73) Assignee: Six Impossible Things Before Breakfast Limited, Dublin (IE)

( * ) Notice: Subject to any disclaimer, the term of this patent is extended or adjusted under 35 U.S.C. 154(b) by 0 days.

(21) Appl. No.: 18/616,967

(22) Filed: Mar. 26, 2024

(65) Prior Publication Data

US 2024/0333421 A1　　Oct. 3, 2024

Related U.S. Application Data

(60) Provisional application No. 63/492,313, filed on Mar. 27, 2023.

(51) Int. Cl.
H04L 1/00　　　　(2006.01)
H04L 1/08　　　　(2006.01)
(52) U.S. Cl.
CPC .......... H04L 1/0042 (2013.01); H04L 1/0063 (2013.01); H04L 1/08 (2013.01)
(58) Field of Classification Search
CPC ....... H04L 1/08; H04L 1/0042; H04L 1/0057; H04L 1/0063; H04L 1/0041; H04L 1/0061; H04L 1/0064; H04L 1/0067; H03M 13/11; H03M 13/095; H03M 13/098; H03M 13/251
See application file for complete search history.

(56) References Cited

U.S. PATENT DOCUMENTS

| | | | |
|---|---|---|---|
| 10,437,691 B1 * | 10/2019 | Barhate | ................. G06F 11/073 |
| 10,841,222 B2 | 11/2020 | Ignatchenko | |
| 11,515,890 B2 * | 11/2022 | Connor | .............. H03M 13/373 |

(Continued)

FOREIGN PATENT DOCUMENTS

WO　　　WO 99/30462 A2　　6/1999

OTHER PUBLICATIONS

International Search Report dated Jul. 9, 2024, issued in Int'l Appln. No. PCT/IB2024/052905.

(Continued)

*Primary Examiner* — Shelly A Chase
(74) *Attorney, Agent, or Firm* — Arnold & Porter Kaye Scholer LLP

(57)　　　　ABSTRACT

The systems and methods described herein provide techniques for improving asset download time using forward error correction to recover lost packets or data. In various implementations, a sending device may be configured to encode redundant data in a data stream that enables a receiving device to reconstruct the data in the file if a portion of the data is not received. The redundant data may be based on single parity, in which the redundant data is generated using XOR (similar to the RAID-5 encoding methods), or the redundant data may be based on dual parity, in which the redundant data is generated using Galois fields (similar to the RAID-6 encoding methods). In some embodiments, the redundant data may be transmitted in separate packets. In other embodiments, the redundant data may be included as part of the data stream.

28 Claims, 6 Drawing Sheets

(56)          References Cited

U.S. PATENT DOCUMENTS

| 2003/0002502 | A1  | 1/2003 | Gibson et al. |
| 2018/0226993 | A1  | 8/2018 | Stein et al. |
| 2022/0156365 | A1* | 5/2022 | Garba ................... G06F 21/52 |

OTHER PUBLICATIONS

H. Peter Anvin, "The mathematics of RAID-6," published Jan. 20, 2004, last updated Dec. 20, 2011, *available at* https://mirrors.edge.kernel.org/pub/linux/kernel/people/hpa/raid6.pdf (electronic publication).

James S. Plank, "A Tutorial on Reed-Solomon Coding for Fault-Tolerance in RAID-like Systems," *Software—Practice & Experience*, 27(9), pp. 995-1012 (Sep. 1997).

Internet Engineering Task Force (IETF) Request for Comment 1191, "Path MTU Discovery" (Nov. 1990).

* cited by examiner

502 — SPLITTING DATA TO BE TRANSMITTED INTO ONE OR MORE DATA CHUNKS

504 — ENCODING A DATA STREAM COMPRISING THE ONE OR MORE DATA CHUNKS WITH REDUNDANT DATA

506 — TRANSMITTING THE ENCODED DATA STREAM BY THE SENDING DEVICE

602 — RECEIVING THE TRANSMITTED DATA BY THE RECEIVING DEVICE

604 — RECEIVED DATA INCLUDES DATA LOSS ?

NO

YES

606 — RECONSTRUCTING A MISSING PORTION OF THE TRANSMITTED DATA USING THE REDUNDANT DATA

608 — PROVIDING THE RECEIVED DATA TO THE APPLICATION LAYER

SYSTEMS AND METHODS FOR IMPROVING ASSET DOWNLOAD TIME USING FORWARD ERROR CORRECTION

RELATED APPLICATIONS

This application claims priority to U.S. Provisional Application No. 63/492,313, entitled "Method for Improving Asset Download Times Over UDP-Based Channels in Presence of Packet Loss," filed on Mar. 27, 2023, the content of which is hereby incorporated herein by reference in its entirety.

FIELD OF THE DISCLOSURE

The systems and methods described herein relate generally to packet processing in communication networks.

BACKGROUND

When downloading digital assets (such as three-dimensional models, textures, or other game content), it is often desirable to reduce the total download time. Unfortunately, traditional channels have an unpleasant effect known as head-of-line ("HOL") blocking. HOL blocking occurs with ordered streams, such as Transmission Control Protocol (TCP), when data packets are held up in a queue by a first lost-in-transit packet. While the other packets may already be on the receiving side of the communication, to preserve ordering guarantees, they cannot be delivered to the application until the missing packet is retransmitted. For such lost-in-transit packets (e.g., when an IP packet is lost while being transmitted over the internet), this often causes the download channel to cause an additional delay, usually at least a round-trip time ("RTT") delay (and often a delay closer to two times RTT), and RTT may easily be in the range of 100-200 ms. This delay is often needed for the sending side to realize that a specific packet is missing and has to be retransmitted, and for the retransmitting itself. For longer and/or larger downloads, these delays can accumulate. With the User Datagram Protocol (UDP), which by itself does not guarantee packet delivery, it is common to use so-called "Reliable UDP" libraries on top of it. However, as soon as a "Reliable UDP" library starts providing some kind of an ordered stream, it can begin suffering from the same HOL blocking problem described above (with delays on the order of RTT involved).

Forward error correction is one technique used to control errors in data transmissions. Forward error correction works by adding redundant bits to a bitstream to help the decoder detect and correct some transmission errors without the need for retransmission. While forward error correction as a design principle is known in the art, its application to specific scenarios requires specific analysis and specific methods. As such, there is a need in the art for improved techniques which allow using forward error correction in conjunction with downloads over packet-oriented networks, such as IP-based networks.

SUMMARY OF THE DISCLOSURE

This disclosure relates to systems and methods for improving asset download time using forward error correction to recover lost packets or data. In various implementations, a sending device may be configured to encode redundant data in a data stream that enables a receiving device to reconstruct the data in the file if a portion of the data is not received. In some implementations, the redundant data may be based on single parity, in which the redundant data is generated using XOR (similar to the RAID-5 encoding methods). In other implementations, the redundant data may be based on dual parity, in which the redundant data is generated using Galois fields (similar to the RAID-6 encoding methods). In various implementations, the redundant data may be transmitted with the file to be downloaded as part of a data stream. The data stream may be transmitted and received using an existing protocol. For example, the existing protocol may be a UDP-based stream-oriented protocol such as SCTP, QUIC, or HTTP/3. In various implementations, a receiving device may be configured to receive the encoded data stream including the redundant data. If no packets or data are lost, the data stream may be fed immediately to the application level. If one packet in a data chunk is lost, but all the other packets in the chunk (including a redundant packet) are received, the missing packet may be reconstructed using the received packets (including the redundant packet).

According to one embodiment of the invention, the redundant data may be encoded with the data to be transmitted by first splitting the file to be downloaded into a plurality of packets. In some embodiments, each of the one or more data chunks may comprise a same number of the plurality of packets. In some embodiments, the number of packets in each of the one or more data chunks may be based on maximum expected packet loss. In some embodiments, an additional packet including redundant data may be generated for each of the one or more data chunks, with which a receiving device may be able to reconstruct a packet of the data chunk that is not received if all other packets are received but the missing packet. In such embodiments, the redundant data may comprise an XOR of each of the number of packets in the data chunk. In other embodiments, two additional packets with redundant data may be generated for each data chunk, with the two additional packets being generated based on Galois fields. According to another embodiment of the invention, the redundant data may be encoded as part of the data stream. For example, a data stream may be considered as comprising data chunks, and after each such chunk, redundant data may be encoded. In various implementations, the redundant data encoded after each data chunk is a size of an expected maximum of maximum transport unit (MTU). In such implementations, a desirable MTU may be negotiated as part of an existing protocol. For example, an optimal MTU may be as close as possible to a lowest-possible value.

These and other objects, features, and characteristics of the systems and/or methods disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and case of illustration, these drawings are not necessarily drawn to scale.

DETAILED DESCRIPTION

Certain illustrative aspects of the systems and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
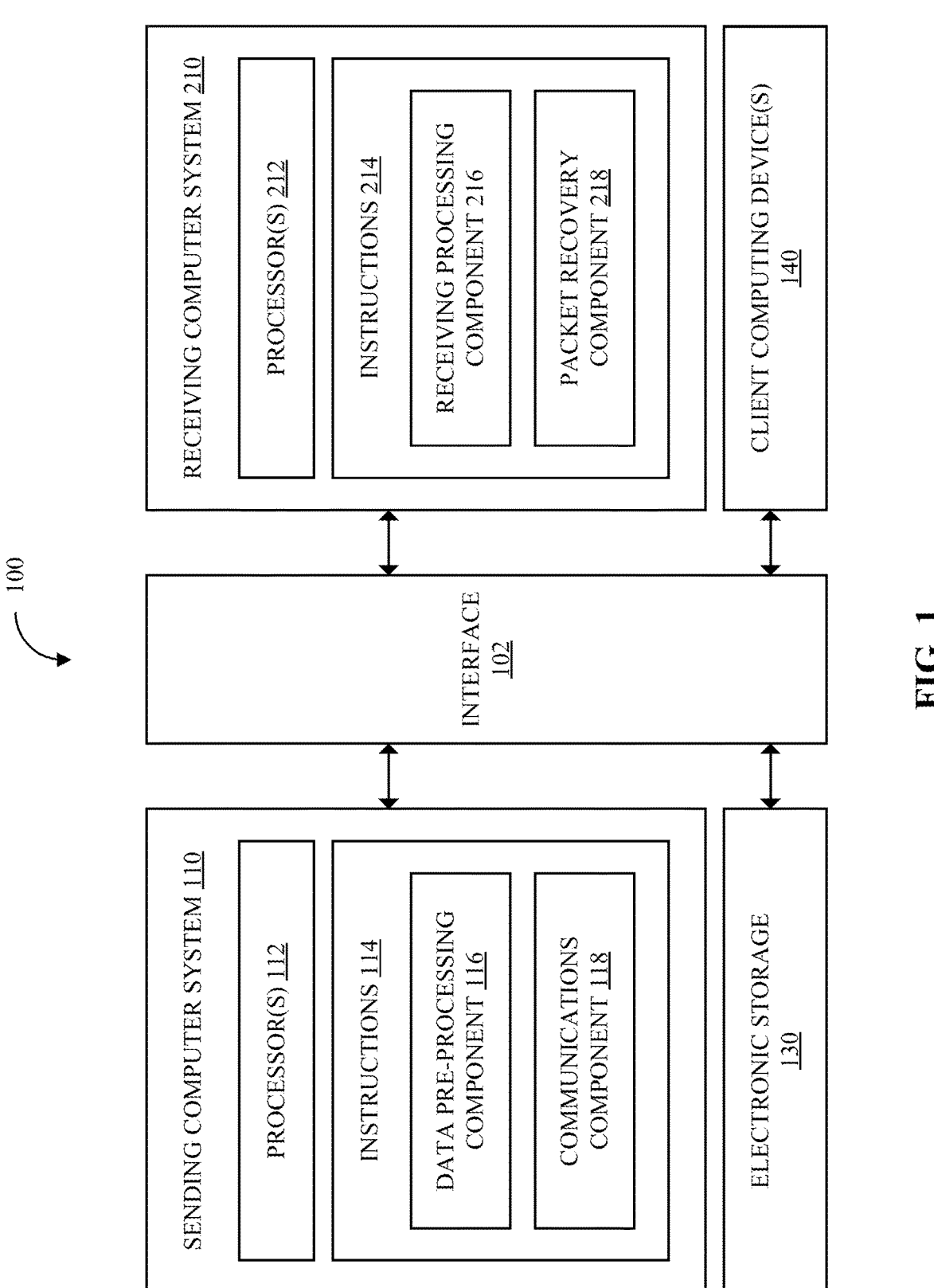
FIG. 1 depicts a block diagram of an example of a system configured to improve asset download time using forward error correction to recover lost packets or data, according to one or more aspects described herein.

FIG. 1 depicts a block diagram of a system 100 configured to improve asset download time using forward error correction to recover lost packets or data, according to one or more aspects described herein. In various implementations, system 100 may include one or more of interface 102, a sending computer system 110, electronic storage 130, client computing device(s) 140, a receiving computer system 210, and/or other components. In various implementations, sending computer system 110 may include one or more physical processors 112 (also interchangeably referred to herein as processor(s) 112, processor 112, or processors 112 for convenience), computer readable instructions 114, and/or one or more other components. In various implementations, receiving computer system 210 may include one or more physical processors 212 (also interchangeably referred to herein as processor(s) 212, processor 212, or processors 212 for convenience), computer readable instructions 214, and/or one or more other components. In some implementations, system 100 may include one or more external resources, such as sources of information outside of system 100, external entities participating with system 100, and/or other resources. In various implementations, system 100 may be configured to receive input from or otherwise interact with one or more users via one or more client computing device(s) 140 and/or other systems or devices. For example, one or more components of system 100 may be configured to receive data or information (e.g., in the form of packets) from a remote game server (not illustrated).

In various implementations, processor(s) 112, 212 may be configured to provide information processing capabilities in system 100. As such, the processor(s) 112, 212 may comprise one or more of a digital processor, an analog processor, a digital circuit designed to process information, a central processing unit, a graphics processing unit, a microcontroller, a microprocessor, a field programmable gate array (FPGA), an application specific integrated circuit (ASIC), a System on a Chip (SoC), and/or other mechanisms for electronically processing information. Processor(s) 112, 212 may be configured to execute one or more computer readable instructions 114, 214. Computer readable instructions 114, 214 may include one or more computer program components. In various implementations, computer readable instructions 114 may include one or more of data preprocessing component 116, communications component 118, and/or one or more other computer program components, and computer readable instructions 214 may include receiving processing component 216, packet recovery component 218, and/or other computer program components. As used herein, for convenience, the various computer readable instructions 114, 214 will be described as performing an operation, when, in fact, the various instructions program the processor(s) 112, 212 (and therefore system 100) to perform the operation.

Figures 2A, 2B:
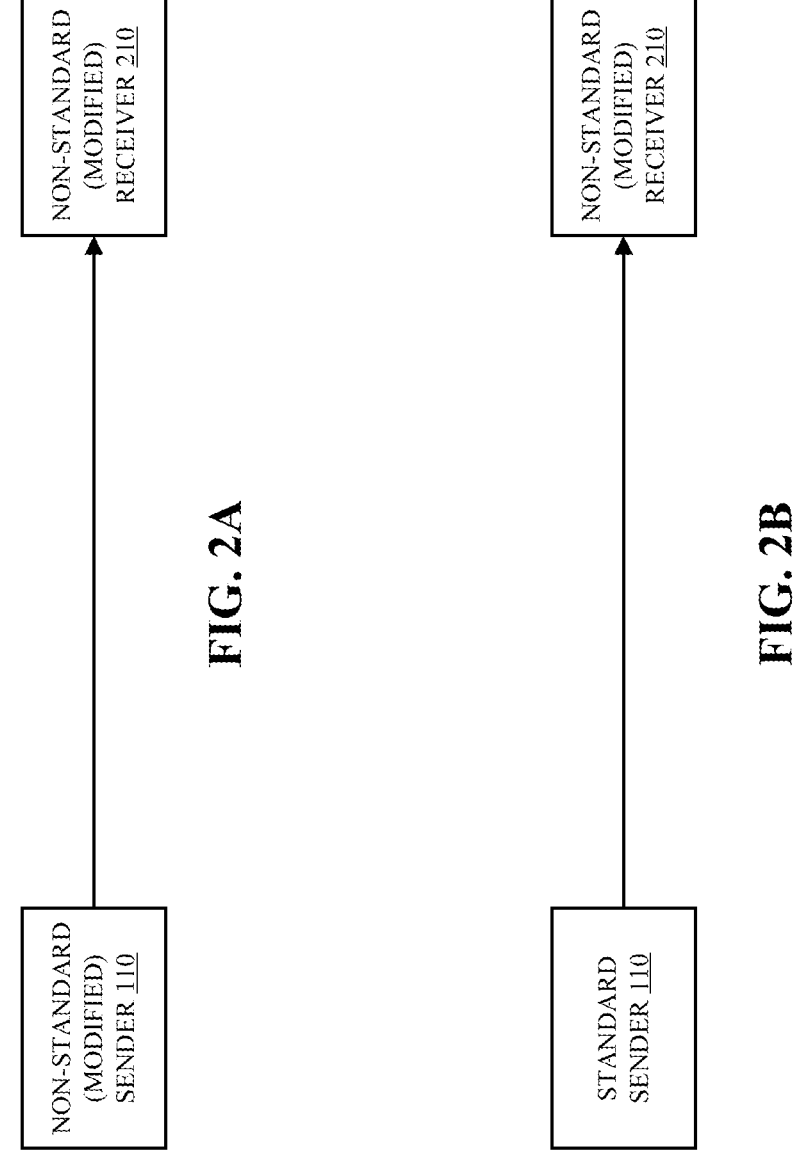
FIGS. 2A-2B depict block diagrams of the system in FIG. 1 in a first embodiment and a second embodiment, each including a sending computer system and a receiving computer system, according to one or more aspects described herein.

As discussed herein, the systems and methods for improving asset download time using forward error correction include at least a first embodiment and second embodiment. According to the first embodiment, a non-standard (modified) sending computer system 110 (or implementation of a modified protocol on the sending computer system 110) is used to transmit packets to a non-standard (modified) receiving computer system 210 (or implementation of the modified protocol on the receiving computer system 210) as depicted, for example, in FIG. 2A. According to the second embodiment, a standard (non-modified) sending computer system 110 (or implementation of a standard protocol on the sending computer system 110) is used to transmit packets to a non-standard (modified) receiving computer system 210 (or implementation of a modified protocol on the receiving computer system 210) as depicted, for example, in FIG. 2B. In the first embodiment, even if a standard protocol is used (such as SCTP, QUIC, or HTTP/3), a non-standard (modified) sender is used with a non-standard (modified) receiver. In the second embodiment, non-standard UDP-based protocols are not used. This, coupled with the use of a standard (non-modified) sender with a non-standard (modified) receiver, allows system 100 (in the second embodiment) to use standard HTTP/3-supporting servers and existing content delivery networks ("CDNs"). Although described herein as a first embodiment and a second embodiment for case of understanding, the corresponding disclosure is not intended to be limited to either the first or second embodiment. Rather, regardless of whether so indicated herein, disclosure herein related to the first embodiment may also apply to the second embodiment, and disclosure herein related to the second embodiment may also apply to the first embodiment, as would be recognized by a person of ordinary skill in the art.

Figure 3:
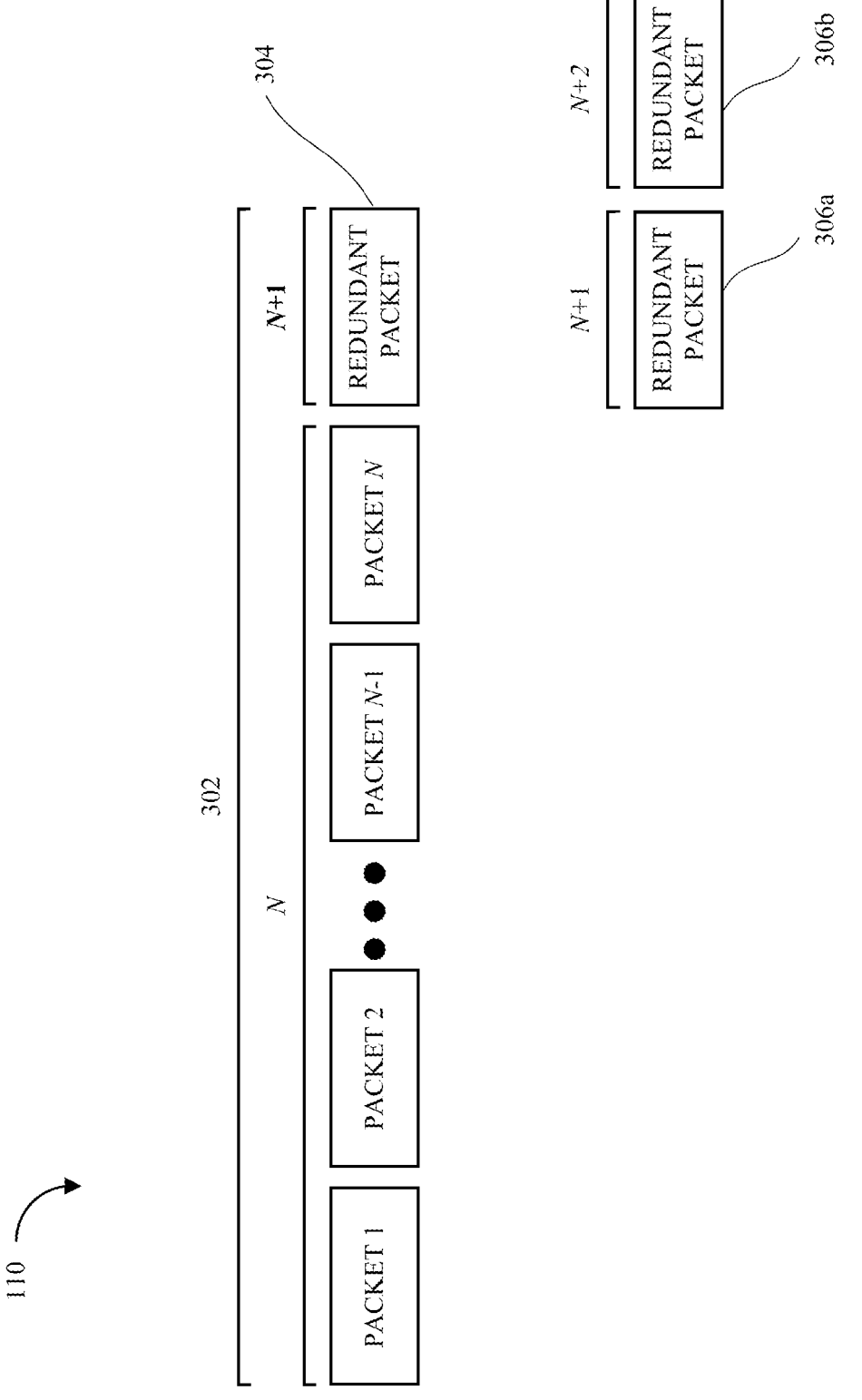
FIG. 3 depicts a block diagram illustrating examples of packets processed prior to transmission in sending computer system, according to one or more aspects of a first embodiment described herein.

In the first embodiment, prior to transmission of a file (which may comprise, for example, a digital asset for an online game), data pre-processing component 116 may be configured to split the file (or data stream) into payload packets (which may also be referred to herein as "IP packets"). For example, FIG. 3 depicts a block diagram illustrating examples of packets processed in sending computer system 110 prior to transmission, according to one or more aspects of a first embodiment described herein. As shown in FIG. 3, in various implementations, data pre-processing component 116 may be configured to split a file to be transmitted into N number of UDP "payload" packets (e.g., packets 1 through N). In some implementations, the number N may be based on pre-defined parameter. For example, in some implementations, the number N may be based on maximum expected packet loss. In some implementations, the number N may be a value between 5 and 20. In other implementations, the number N may be any other appropriate number. Each such N number of packets may form a "chunk" (e.g., such as chunk 302 depicted in FIG. 3).

In the first embodiment, for each chunk 302, data pre-processing component 116 may be configured to send a $N+1^{st}$ redundant packet 304 with the sequence of N data packets. The redundant packet 304 may include redundant information for the file to be transmitted, allowing receiving computer system 210 to restore lost packets without requiring sending computer system 110 to re-transmit any of the N+1 packets that are lost during transmission of the file. Notably, the order of the packets within the chunk is not important. For example, redundant packet 304 may be sent last within the chunk (as shown on FIG. 3), first within the chunk, or at any other position within the chunk.

In various implementations, data pre-processing component 116 may generate redundant packet 308 by generating an exclusive-OR ("XOR") of all payload packets within chunk 302. For example, data pre-processing component 116 may be configured to form the redundant packet 304 using one or more Redundant Array of Independent Disks (RAID) encoding methods. For example, the one or more RAID encoding methods may comprise RAID-5 encoding methods, RAID-6 encoding methods, and/or one or more other RAID encoding methods. In some implementations, the one or more RAID encoding methods may be similar to the RAID encoding methods described in U.S. patent application Ser. No. 15/640,565, entitled "SYSTEMS, APPARATUSES AND METHODS FOR NETWORK PACKET MANAGEMENT," filed Jul. 2, 2017, the content of which is hereby incorporated by reference herein in its entirety. In some implementations, the application of one or more RAID encoding methods may comprise using RAID-5 parity logic (such as described in U.S. patent application Ser. No. 15/640,565), but applied to packets in a chunk rather than to data written to or read from multiple disks in a RAID array. For example, data pre-processing component 116 may be configured to form the redundant packet 304 by performing an exclusive-OR ("XOR") of all payload packets within the data chunk 302.

In various implementations, in the first embodiment, data pre-processing component 116 may be configured to form the redundant packet 304 by applying RAID-5 parity logic to all payload packets within the data chunk 302. In some implementations, payload packets of the same size may be used to facilitate this formation. In some implementations, instead of providing a single redundant packet with parity similar to RAID-5, the data pre-processing component 116 of sending computer system 110 may use "dual parity" within two redundant packets, similar to RAID-6, and calculate "dual parity" for these two redundant packets based on $G(2^8)$ Galois fields. For example, data pre-processing component 116 may be configured to calculate "dual parity" for these two redundant packets based on $G(2^8)$ Galois fields as described, for example, in "The mathematics of RAID-6" by H. Peter Anvin (last updated Dec. 20, 2011), which is available at https://web.archive.org/web/20220119172244/https://mirrors.edge.kernel.org/pub/linux/kernel/p cople/hpa/raid6.pdf, and which is incorporated by reference in its entirety herein. In such implementations, data pre-processing component 116 may be configured to form the redundant packets 306a, 306b by applying RAID-6 parity logic to all payload packets within the data chunk 302. In some implementations, payload packets of the same size may be used to facilitate this formation.

In some implementations, RAID-5/RAID-6 logic may be generalized to provide an arbitrary (or predetermined) number of redundant packets M (in turn, allowing recovery from the loss of any M packets out of a chunk consisting of N+M packets). This may be done, for example, by using Reed-Solomon coding. For example, in some implementations, first, Reed-Solomon Coding may be applied to RAID-like systems as described, for example, in "A Tutorial on Reed-Solomon Coding for Fault-Tolerance in RAID-like Systems" by James S. Plank, which was published in Software-Practice & Experience, Vol. 27, Issue 9 (September 1997) at pp. 995-1012, the content of which is hereby incorporated by reference herein in its entirety. Second, after Reed-Solomon Coding is applied to RAID-like systems, effectively generating RS-RAID logic with N original and M redundant RAID drives, this logic may be applied to N original and M redundant packets. In some implementations, Bose-Chaudhuri-Hocquenghem codes (BCH codes) may be used in lieu of Reed-Solomon Codes.

In some implementations, when packet sizes are different, data pre-processing component 116 may be configured to pad smaller packets with a predefined filler, such as all-zeros, such that the XOR and/or RAID-5/RAID-6/RS-RAID logic may be applied to same-sized packets. In other implementations, when the number of payload packets is not a multiple of N, data pre-processing component 116 may be configured to generate a data chunk 304 with a smaller-than-N number of packets, and send the redundant packet at the end of the data stream. This will enable receiving computer system 210 to recover a lost packet in data chunk 302 with a shorter or smaller number of data packets.

In various implementations, communications component 118 may be configured to use a standard User Datagram Protocol (UDP)-based stream-oriented protocol such as SCTP, QUIC, or HTTP/3 as a base. When used herein, "SCTP" (or "Stream Control Transmission Protocol") may also refer to implementations of SCTP over UDP, for example, as defined in the Internet Engineering Task Force (IETF) Request for Comment 6951, entitled "UDP Encapsulation of Stream Control Transmission Protocol (SCTP) Packets for End-Host to End-Host Communication." Also, when referred to herein, HTTP/3 is to be understood as using QUIC as its underlying protocol. In some implementations, communications component 118 may be configured to use non-standard UDP-based protocols that provide reliable channels as a base. For example, approaches used in "reliable UDP" libraries such as ENet or RakNet may be used. In addition, an encryption protocol, such as Datagram Transport Layer Security (DTLS), may be used in conjunction with most of the stream-oriented protocols. Regardless of the protocol(s) used, communications component 118 may take the packets prepared by the data pre-processing component 116, process them as specified by the underlying protocol(s) (such processing may include, among other things, calculating and adding checksums, encryption, and so on)—and then to emit them to the interface 102 (usually as UDP packets).

In various implementations, in the first embodiment, receiving processing component 216 of receiving computer system 210 may be configured to receive the packets of chunk 302. In various implementations, receiving processing component 216 may be configured to reorder the packets as necessary. If no packets are lost, receiving processing component 216 may be configured to feed the packets to the application level immediately. If one packet in chunk 302 is missing, but all the other packets in the chunk (including redundant packet) are received, packet recovery component 218 of receiving computer system 210 may be configured to reconstruct the missing packet using all the packets in the chunk (including redundant packet). If XOR-based (RAID-5-like parity) logic described above is used to construct the redundant packet, packet recovery component 218 may be configured to reconstruct the missing packet by XOR-ing all the packets in the chunk (including redundant packet) while observing the same padding rules as those used when calculating the redundant packet on the sending side (if applicable).

In some implementations, if RAID-6 is used, and no packets are lost, but one packet is corrupted, packet recovery component 218 may perform detection and recovery of this corrupted packet, for example, as described in section "Single-disk corruption recovery" of the aforementioned "The mathematics of RAID-6" by H. Peter Anvin. In some implementations, similar recovery techniques may be used to detect and fix corrupted packets for any chunks with number of redundant packets with M>=2 (for example, if Reed-Solomon-based RS-RAID with M>=2 is used).

In the second embodiment, prior to transmission of a file (which may comprise, for example, a digital asset for an online game), sending computer system 110 may similarly process packets based on "data chunks." For example, each file to be transmitted may be represented as a set of data chunks. In the second embodiment, each chunk may consist of up to N*MTU bytes (where "MTU" is a pre-defined number representing an estimate of MTU for a channel being used to transmit the file from sending computer system 110 to receiving computer system 210. Notably, as used herein, the term "MTU" may refer to MTU over a whole path which packets may traverse, or "Path MTU," for example, as described in the Internet Engineering Task Force (IETF) Request for Comment 1191, entitled "Path MTU Discovery" (hereinafter referred to as "RFC1191"). For example, in some embodiments, an MTU of 1500 bytes (corresponding to an MTU of popular Ethernet networks) or 1280 bytes (corresponding to a minimum MTU guaranteed by IPV6) may be used. In some implementations, these numbers may be reduced to accommodate for header sizes of in-between protocols (e.g., this reduction may be between 0 and 100 bytes). In some implementations, data pre-processing component 116 may be configured to choose values that are close to the QUIC-supported minimum of 1200. In other implementations, the MTU may be any other appropriate size. In some implementations, data pre-processing component 116 may be configured to restrict the MTU by negotiating MTU with the sending computing system 110. For example, if QUIC or HTTP/3 protocols are used, data pre-processing component 116 may be configured to negotiate a max_udp_payload_size parameter with the sender. In some implementations, Path MTU Discovery (as described, for example, in RFC1191), or any similar techniques, may be used to negotiate MTUs. In the second embodiment, to create the preprocessed file, data pre-processing component 116 may be configured to place, after each chunk, "redundant data" with the size of MTU. "Redundant data" may be calculated in the same manner as "redundant packet" is calculated in the first embodiment. In order words, to calculate the redundant data, data pre-processing component 116 may be configured to split the file into pseudo-packets, each having MTU size, obtain chunks (each chunk containing at most N pseudo-packets), and generate a redundant pseudo-packet for each chunk. In various implementations, the redundant data may be calculated as described above with respect to the first embodiment and FIG. 3.

Figure 4:
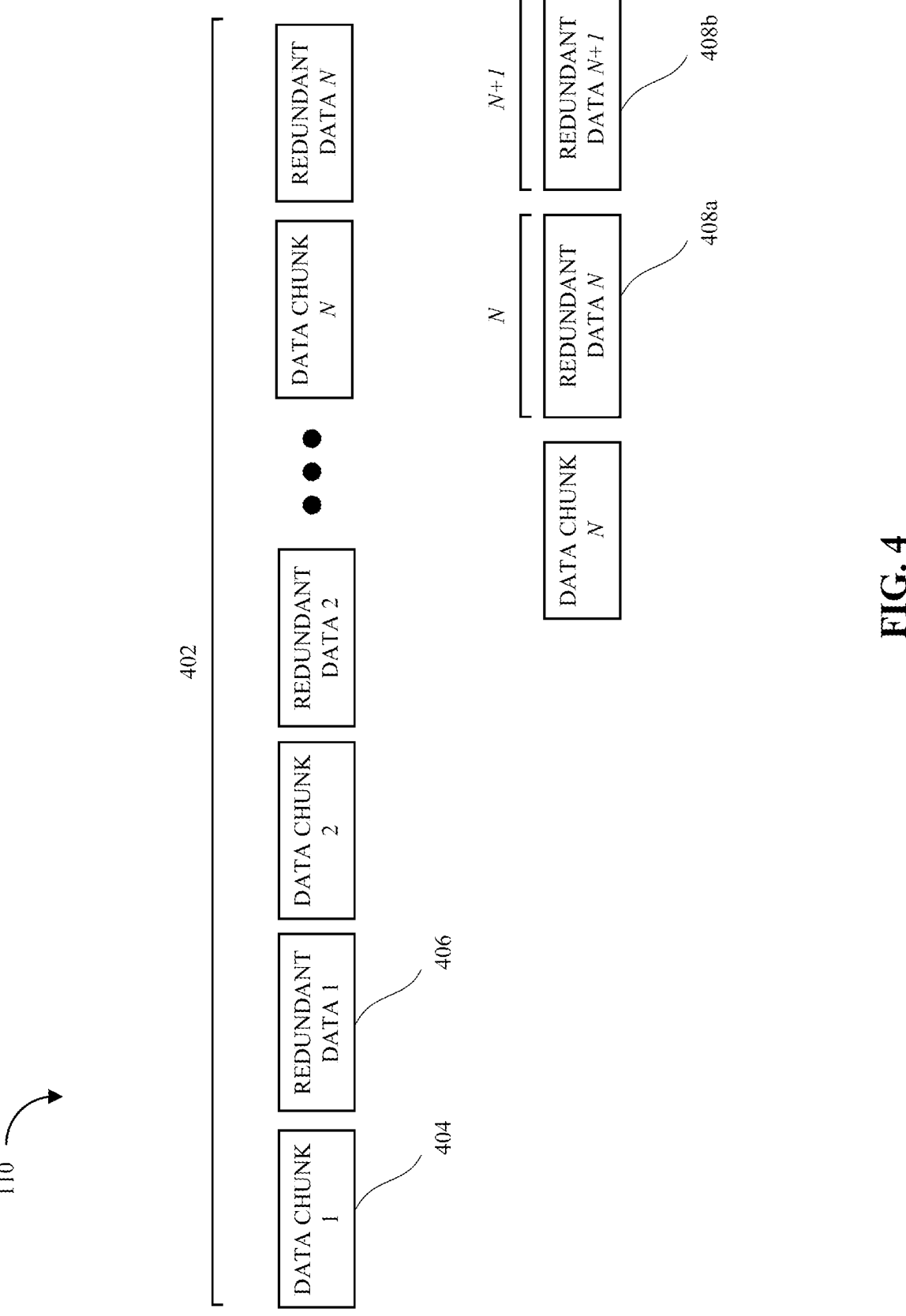
FIG. 4 depicts a block diagram illustrating examples of packets received by a receiving computer system, according to one or more aspects of a second embodiment described herein.

In various implementations, in the second embodiment, receiving processing component 216 of receiving computer system 210 may be configured to receive the packets. For example, FIG. 4 depicts a block diagram illustrating examples of packets received by receiving computer system 210, according to one or more aspects of the second embodiment described herein. For example, as depicted in FIG. 4, a file may consist of up to N data chunks 404, each chunk 404 consisting of up to N*MTU bytes. After each data chunk 404, redundant data 406 may be encoded, also each having MTU size. In various implementations, receiving processing component 216 may be configured reorder the packets as necessary. If no packets are lost, receiving processing component 216 may be configured to feed the packets to the application level immediately. Notably, in the second embodiment, there is not a guarantee that received packets are aligned along the lines of MTU. As such, in some implementations, a single missing UDP packet may cause partial data loss from two pseudo-packets. Nevertheless, packet recovery component 218 of receiving computer system 210 may still be able to reconstruct the data from the missing UDP packet so long as the size of the missing UDP packet is less than or equal to MTU. For example, if XOR-based (RAID-5-like parity) logic described above is used to construct redundant data, packet recovery component 218 may be configured to reconstruct the missing portion of the data stream by XOR-ing all the pseudo-packets in the chunk (including redundant data pseudo-packet), while replacing those portions of data within pseudo-packets which were not received due to missing UDP packets, with all-zero bytes. After XOR-ing all the pseudo-packets in the chunk, a pseudo-packet will be produced that contains the missing portion of the data stream. In some cases, the resulting pseudo-packet may include a possible wrap-around of the missing portion over the pseudo-packet boundary. Using the pseudo-packet produced by XOR-ing all the pseudo-packets in the chunk, packet recovery component 218 may be configured to replace the missing portion of data into the data stream, and the resulting reconstructed data chunk may be served to the application level.

As described herein, recovery data 408a, 408b may include dual-parity based recovery data, similar to RAID-6 scheme. In such implementations, each of recovery data 408a, 408b may include data of MTU size. In various implementations, the recovery data 408a may be configured to include a first parity, and the recovery data 408b may be configured to include a second parity.

In various implementations, packet recovery component 218 may be configured to recover or reconstruct missing-portions of the data chunks using redundant packets (such as redundant packets 304, 306a, 306b depicted in FIG. 3 or redundant data 406, 408a, 408b depicted in FIG. 4), without the need of requesting the sender for re-transmission of the data lost. For example, in the first or second embodiment, the receiver (or implementation of the standard protocol on the receiving computer system 210) may be modified so that it is configured to allow packets to be processed as described above, to enable data recovery. In some implementations, the receiver may further be modified to deliver data (including recovered data if necessary) to the application level, including when packets were missing, but the data was successfully recovered using one of forward-correction methods (such as, for example, XOR, RAID-5, RAID-6, Reed-Solomon Codes, and/or BCH Codes) as described herein. This may, in some cases, obviate the need to request the sender for re-transmission of the lost packets, and therefore avoid delays which would be introduced by HOL blocking if traditional methods and standard protocols were used, while also preserving traditional and convenient semantics of the ordered data stream for the application level.

In some implementations, in the first or second embodiment, receiver (or the implementation of the standard protocol on the receiving computer system 210) may be modified so that it is configured to skip "fast recovery" mechanisms of the protocol (e.g., "fast retransmit" in the QUIC protocol) until more than one packet in the chunk is lost. In other implementations, receiving computer system 210 may be configured to issue a fast recovery notification responsive to determining that a packet is missing to reduce a recovery time in the event more than one packet is lost.

In some implementations, in the first or second embodiment, if the protocol itself implies encryption, to allow for decryption of the payload for the packets following a missed packet in a sequence, data pre-processing component 116 may be configured to use protocols with per-packet encryption schema such as DTLS, QUIC and HTTP/3. In an alternative implementation, data pre-processing component 116 may be configured to use "null" encryption protocol (effectively discarding encryption).

Electronic storage 130 may include electronic storage media that electronically stores and/or transmits information. The electronic storage media of electronic storage 130 may be provided integrally (i.e., substantially nonremovable) with one or more components of system 100 and/or removable storage that is connectable to one or more components of system 100 via, for example, a port (e.g., USB port, a Firewire port, and/or other port) or a drive (e.g., a disk drive and/or other drive). Electronic storage 130 may include one or more of optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EPROM, EEPROM, RAM, and/or other electrical charge-based storage media), solid-state storage media (e.g., flash drive and/or other solid-state storage media), and/or other electronically readable storage media. Electronic storage 130 may be a separate component within system 100, or electronic storage 130 may be provided integrally with one or more other components of system 100 (e.g., computer system 110, 210 or processor 112, 212). Although electronic storage 130 is shown in FIG. 1 as a single entity, this is for illustrative purposes only. In some implementations, electronic storage 130 may comprise a plurality of storage units. These storage units may be physically located within the same device, or electronic storage 130 may represent storage functionality of a plurality of devices operating in coordination.

Electronic storage 130 may store software algorithms, information determined by processors 112, 212, information received remotely, and/or other information that enables system 100 to function properly. For example, electronic storage 130 may store information relating to one or more digital assets, one or more existing encoding methods used to encode data packets, one or more existing decoding methods used to decode data packets, information associated with different protocols, and/or other information related to the systems and methods described herein.

Client computing device(s) 140 (also interchangeably referred to herein as client computing device 140, client computing devices 140, or one or more client computing devices 140) may be used by users of system 100 to interface with system 100. Client computing device(s) 140 may be configured as a server device (e.g., having one or more server blades, processors, etc.), a gaming console, a hand-held gaming device, a personal computer (e.g., a desktop computer, a laptop computer, etc.), a smartphone, a tablet computing device, an Internet of Things (IoT) device, a wearable device, and/or other devices that can be programmed to interface with sending computer system 110 and/or receiving computer system 210.

Figure 5:
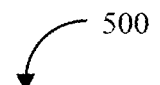
FIG. 5 illustrates a method of improving asset download time by sending redundant data for recovering lost packets or data using forward error correction, according to one or more aspects described herein.
Figure 5:
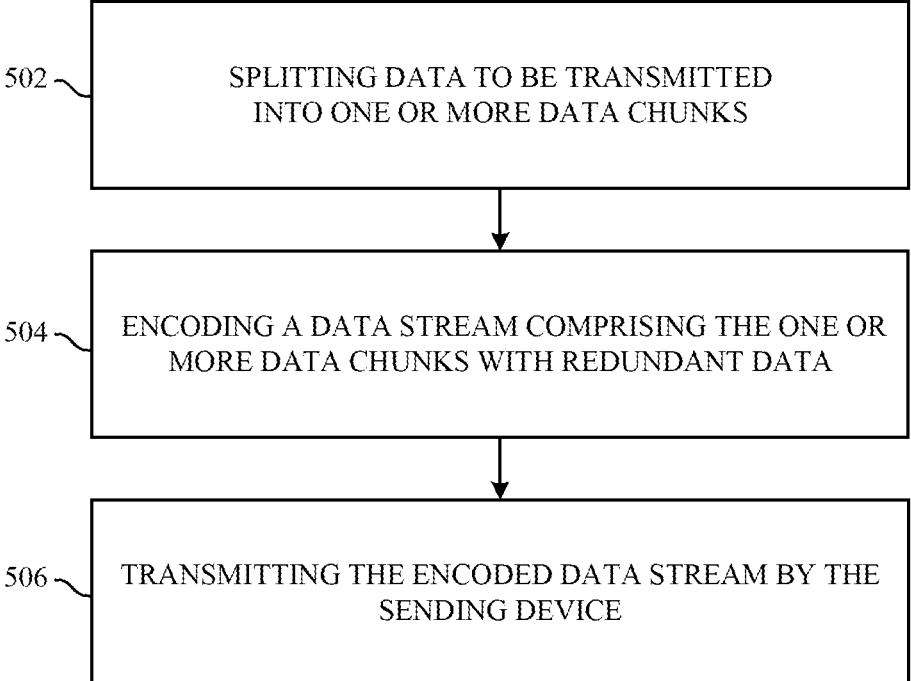

FIG. 5 illustrates an example of a process 500 for improving asset download time by sending redundant data for recovering lost packets or data using forward error correction, according to one or more aspects described herein. The operations of process 500 presented below are intended to be illustrative and, as such, should not be viewed as limiting. In some implementations, process 500 may be accomplished with one or more additional operations not described, and/or without one or more of the operations discussed. In some implementations, two or more of the operations of process 500 may occur substantially simultaneously. The described operations may be accomplished using some or all of the system components described in detail above.

In an operation 502, process 500 may include a sending device splitting data to be transmitted into one or more data chunks. As used herein, data or file to be transmitted may be interchangeably referred to herein as a "file to be downloaded." In some implementations, splitting the data to be transmitted into one or more data chunks may comprise splitting the file to be transmitted into a plurality of packets. In some implementations, each of the one or more data chunks may comprise a same number of the plurality of packets, or pseudo-packets. In such implementations, the number of packets or pseudo-packets in each of the one or more data chunks may be based on maximum expected packet loss. In some implementations, operation 502 may be performed by a processor component the same as or similar to data pre-processing component 116 (shown in FIG. 1 and described herein).

In an operation 504, process 500 may include the sending device encoding a data stream comprising the one or more data chunks with redundant data. In various implementations, the redundant data enables a receiving device to reconstruct the data in the file if a portion of the one or more data chunks is not received. In various implementations, the redundant data may be generated based on single parity. For example, the redundant data encoded with a data chunk may comprise an XOR of all the packets or pseudo-packets in the data chunk. In various implementations, the redundant data may be generated based on dual parity. For example, the redundant data encoded with a data chunk may be generated based on Galois fields. In some implementations, encoding a data stream comprising one or more data chunks with redundant data may comprise encoding each of the one or more data chunks with redundant data. In such implementations, encoding each of the one or more data chunks with redundant data may comprise generating an additional packet or pseudo-packet including the redundant data. In some implementations, the additional packet for a given data chunk may enable the receiving device to reconstruct a packet of the data chunk that is not received if all other packets associated with the data chunk are received but the missing packet. For example, the redundant data of the additional packet may comprise an XOR of each of the number of packets in the data chunk. When redundant data is generated based on dual parity, two additional packets may be generated for each data chunk, with the two additional packets are generated based on Galois fields. In some implementations, encoding the data stream with redundant data may comprise encoding redundant data after each of the one or more data chunks.

In some implementations, the redundant data encoded after each data chunk may be the size of an expected maximum of maximum transport unit (MTU). In some implementations, a desirable MTU may be negotiated as part of an existing protocol (for example, using Path MTU Discovery). In some implementations, operation 504 may be performed by one or more processor components the same as or similar to data processing component 116 (shown in FIG. 1 and described herein).

In an operation 506, process 500 may include the sending device transmitting the encoded data stream, wherein the redundant data is part of the stream. In various implementations, the data stream may be transmitted using an existing protocol by a standard sending device. As used herein, "sending computer system" may be used interchangeably with "sending device," and "receiving computer system" may be used interchangeably with "receiving device." In some implementations, operation 506 may be performed by one or more processor components the same as or similar to communications component 118 (shown in FIG. 1 and described herein).

Figure 6:
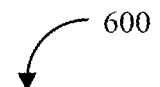
FIG. 6 illustrates a method of improving asset download time using forward error correction to recover lost packets or data, according to one or more aspects described herein.
Figure 6:
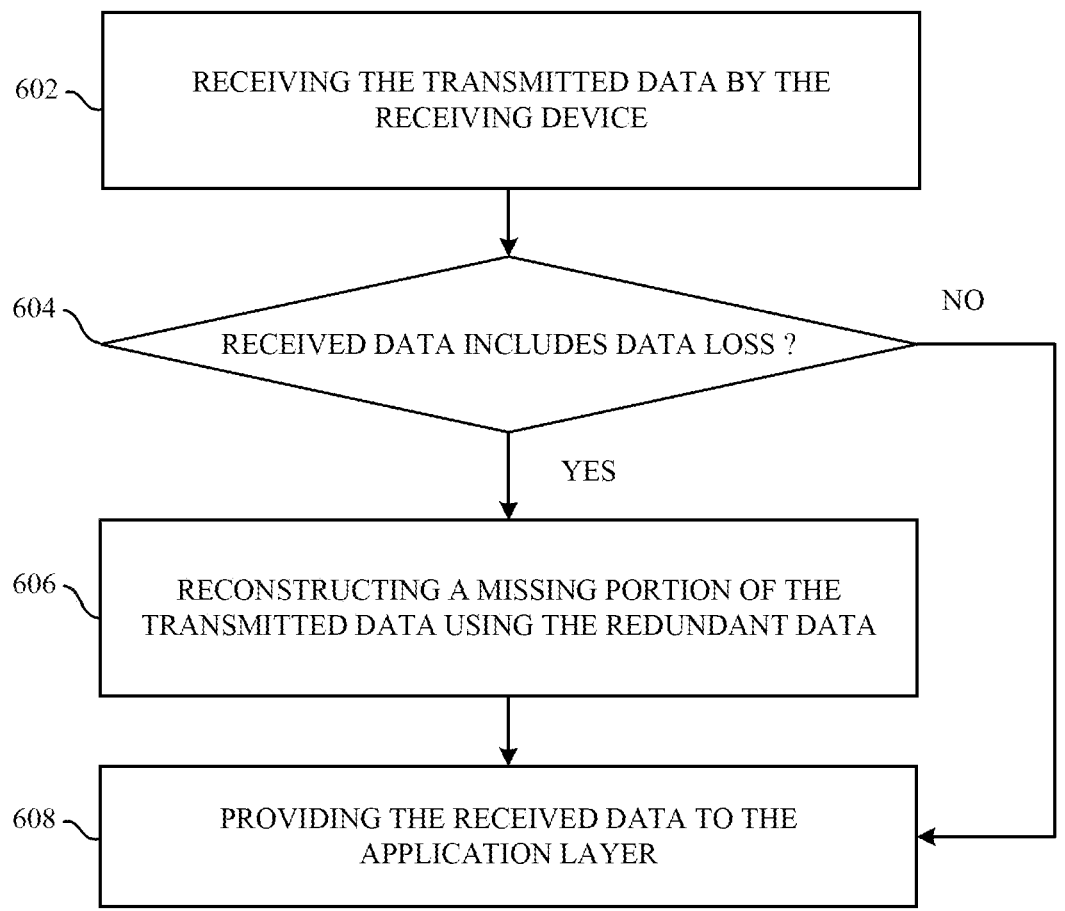

FIG. 6 illustrates an example of a process 600 for improving asset download time using forward error correction to recover lost packets or data, according to one or more aspects described herein. The operations of process 600 presented below are intended to be illustrative and, as such, should not be viewed as limiting. In some implementations, process 600 may be accomplished with one or more additional operations not described, and/or without one or more of the operations discussed. In some implementations, two or more of the operations of process 600 may occur substantially simultaneously. The described operations may be accomplished using some or all of the system components described in detail above.

In an operation 602, process 600 may include the receiving device receiving the encoded data stream, wherein the redundant data is part of the stream. In various implementations, the receiving device may receive the data stream using an existing protocol. In some implementations, the existing protocol may be QUIC, HTTP/3, or another existing protocol. In some implementations, operation 602 may be performed by one or more processor components the same as or similar to receiving processing component 216 (shown in FIG. 1 and described herein).

In an operation 604, process 600 may include the receiving device determining that the received data stream is missing a portion of the one or more data chunks. In some implementations, operation 604 may be performed by one or more processor components the same as or similar to receiving processing component 216 (shown in FIG. 1 and described herein). If it is determined that the one or more data chunks received do not include a data loss during transit, process 600 may proceed to operation 608. If it is determined that the one or more data chunks received include a data loss during transit, process 600 may proceed to operation 606. In various implementations, process 600 may include decoding the one or more data chunks into the data transmitted of a digital asset by using one or more of data packet decoding techniques. For example, process 600 may disassemble the received data to separate the data transmitted from the recovery data (including the redundant data 304, 306*a*, 306*b*, 406, 408*a*, 408*b*).

In an operation 606, process 600 may include the receiving device reconstructing the missing portion of the one or more data chunks using the redundant data responsive to the determination in operation 604. In some implementations, operation 606 may be performed by one or more processor components the same as or similar to packet recovery component 218 (shown in FIG. 1 and described herein).

In an operation 608, process 600 may include the receiving device providing the received data stream to an application layer with the reconstructed portion. In some implementations, operation 608 may be performed by one or more processor components of receiving computer system 210 (shown in FIG. 1 and described herein).

In various implementations, system 100 may be configured to use any kind of packet-based network (such as Internet Protocol (IP), Ethernet, Internetwork Packet Exchange (IPX), X.25, Frame Relay, etc.) instead of UDP. Indeed, the systems and methods described herein will work even if packet delivery is not guaranteed, such as with IP and UDP.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific example aspects and implementations of the disclosure, and performing certain actions.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of digital processors, analog processors, digital circuits designed to process information, central processing units, graphics processing units, microcontrollers, microprocessors, field programmable gate arrays (FPGAs), application specific transformed circuits (ASICs), a System on a Chip (SoC), and/or other mechanisms for electronically processing information—but such implementation decisions should not be interpreted as causing a departure from the scope of the present invention.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112, 212 may be programmed by one or more additional instructions that may perform some or all of the functionality attributed herein to one of the computer-readable instructions.

The various instructions described herein may be stored in electronic storage, which may comprise random access memory (RAM), read only memory (ROM), and/or other memory. In some implementations, the various instructions described herein may be stored in electronic storage of one or more components of system 100 and/or accessible via a network (e.g., via the Internet, cloud storage, and/or one or more other networks). The electronic storage may store the computer program instructions (e.g., the aforementioned instructions) to be executed by processor(s) 112, 212 as well as data that may be manipulated by processor(s) 112, 212. The electronic storage may comprise floppy disks, hard disks, optical disks, tapes, or other storage media for storing computer-executable instructions and/or data.

Although illustrated in FIG. 1 as a single component, sending computer system 110, electronic storage 130, client computing device(s) 140, and receiving computer system 210 may each include a plurality of individual components (e.g., computer devices) each programmed with at least some of the functions described herein. In this manner, some components of sending computer system 110, receiving computer system 210, and/or associated client computing device(s) may perform some functions while other components may perform other functions, as would be appreciated. Furthermore, it should be appreciated that although the various instructions are illustrated in FIG. 1 as being co-located within a single processing unit, in implementations in which processor(s) 112, 212 include multiple processing units, one or more instructions may be executed remotely from the other instructions.

One or more components of system 100 may communicate with each other through hard-wired communication, wireless communication, or both. In various implementations, one or more components of system 100 may communicate with each other through a network. For example, sending computer system 110 and/or receiving computer system 210 may wirelessly communicate with electronic storage 130. By way of non-limiting example, wireless communication may include one or more of radio communication, Bluetooth communication, Wi-Fi communication, cellular communication, infrared communication, or other wireless communication. Other types of communications are contemplated by the present disclosure.

Although sending computer system 110, electronic storage 130, client computing device(s) 140, and receiving computer system 210 are shown to be connected to interface 102 in FIG. 1, any communication medium may be used to facilitate interaction between any components of system 100. For example, as referred to herein, interface 102 may comprise a network via which sending computer system 110 may transmit packets or otherwise communicate with receiving computer system 210. In some implementations, the connections forming the network represented by interface 102 may include Asymmetric Digital Subscriber Line (ADSL), Symmetric Digital Subscriber Line (SDSL), cable, 3G, 4G, LTE, Ethernet, or any other existing or future developed systems and/or methods of communication with similar functionalities. In some implementations, one or multiple connections may be used to facilitate communication (e.g., transmit packets) between sending computer system 110 and receiving computer system 210. Indeed, while described herein as a single interface 102 for simplicity, interface 102 may include one or multiple physical and/or virtual interfaces via which packets may be sent from sending computer system 110 to receiving computer system 210. For example, multiple connections forming a Local Area Network (LAN), Intranet, or Internet may be used to facilitate communication between sending computer system 110 and receiving computer system 210.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered example only, and the scope of the invention is accordingly intended to be limited only by the following claims.

What is claimed is:

1. A computer-implemented method of improving asset download time using forward error correction to recover lost packets or data, the method comprising:

splitting, by a sending device, data in a file to be transmitted into one or more data chunks;

encoding, by the sending device, a data stream comprising one or more data chunks with redundant data, wherein the redundant data is based on dual parity, and wherein the redundant data enables a receiving device to reconstruct the data in the file if a portion of the one or more data chunks is not received; and transmitting, by the sending device to a receiving device, the encoded data stream.

2. The computer-implemented method of claim 1, wherein when based on dual parity, the redundant data encoded with a data chunk is generated based on Galois fields.

3. The computer-implemented method of claim 1, the method further comprising:

splitting, by the sending device, the file to be transmitted into a plurality of packets, wherein each of the one or more data chunks comprises a same number of the plurality of packets, wherein encoding a data stream comprising one or more data chunks with redundant data comprises encoding each of the one or more data chunks with redundant data.

4. The computer-implemented method of claim 3, wherein the number of packets in each of the one or more data chunks is based on maximum expected packet loss.

5. The computer-implemented method of claim 3, wherein encoding each of the one or more data chunks with redundant data comprises generating two additional packets including the redundant data, wherein the two additional packets are generated based on Galois fields.

6. The computer-implemented method of claim 1, wherein encoding the data stream with redundant data comprises encoding redundant data after each of the one or more data chunks.

7. The computer-implemented method of claim 6, wherein the redundant data encoded after each data chunk is a size of an expected maximum of maximum transport unit (MTU).

8. The computer-implemented method of claim 7, wherein a desirable MTU is negotiated as part of an existing protocol.

9. The computer-implemented method of claim 1, the method further comprising:

receiving, by the receiving device, the transmitted data from the sending device, wherein the redundant data is received as part of the data stream.

10. The computer-implemented method of claim 9, wherein the data stream is transmitted using an existing protocol by a standard sending device.

11. The computer-implemented method of claim 9, wherein the receiving device receives the data stream using an existing protocol.

12. The computer-implemented method of claim 11, wherein the existing protocol is QUIC.

13. The computer-implemented method of claim 11, wherein the existing protocol is HTTP/3.

14. The computer-implemented method of claim 1, the method further comprising:

receiving, by the receiving device, the encoded data stream;

determining, by the receiving device, that the received data stream is missing a portion of the one or more data chunks;

responsive to the determination that the received data stream is missing a portion of the one or more data chunks, reconstructing the missing portion of the one or more data chunks using the redundant data; and providing, by the receiving device, the received data stream to an application layer with the reconstructed portion.

15. A system for improving asset download time using forward error correction to recover lost packets or data, the system comprising:

one or more processors configured by computer readable instructions to:

split data in a file to be transmitted into one or more data chunks;

encode a data stream comprising one or more data chunks with redundant data, wherein the redundant data is based on dual parity, and wherein the redundant data enables a receiving device to reconstruct the data in the file if a portion of the one or more data chunks is not received; and transmit the encoded data stream to a receiving device.

16. The system of claim 15, wherein when based on dual parity, the redundant data encoded with a data chunk is generated based on Galois fields.

17. The system of claim 15, wherein the one or more processors are further configured to:

split the file to be transmitted into a plurality of packets, wherein each of the one or more data chunks comprises a same number of the plurality of packets, wherein to encode a data stream comprising one or more data chunks with redundant data, the one or more processors are configured to encode each of the one or more data chunks with redundant data.

18. The system of claim 17, wherein the number of packets in each of the one or more data chunks is based on maximum expected packet loss.

19. The system of claim 17, wherein to encode each of the one or more data chunks with redundant data, the one or more processors are configured to generate two additional packets including the redundant data, wherein the two additional packets are generated based on Galois fields.

20. The system of claim 15, wherein to encode the data stream with redundant data, the one or more processors are configured to encode redundant data after each of the one or more data chunks.

21. The system of claim 20, wherein the redundant data encoded after each data chunk is a size of an expected maximum of maximum transport unit (MTU).

22. The system of claim 21, wherein a desirable MTU is negotiated as part of an existing protocol.

23. The system of claim 15, wherein the receiving device receives the transmitted data, and wherein the redundant data is received as part of the data stream.

24. The system of claim 23, wherein the data stream is transmitted using an existing protocol by a standard sending device.

25. The system of claim 23, wherein the receiving device receives the data stream using an existing protocol.

26. The system of claim 25, wherein the existing protocol is QUIC.

27. The system of claim 25, wherein the existing protocol is HTTP/3.

28. The system of claim 15, wherein the receiving device is configured to receive the encoded data stream, determine that the received data stream is missing a portion of the one or more data chunks, reconstruct the missing portion of the one or more data chunks using the redundant data responsive to the determination that the received data stream is missing a portion of the one or more data chunks, and provide the received data stream to an application layer with the reconstructed portion.

\* \* \* \* \*